United States Patent
Talai et al.

(10) Patent No.: US 11,933,911 B2
(45) Date of Patent: Mar. 19, 2024

(54) RADAR SYSTEM CALIBRATION WITH BISTATIC SIDELOBE COMPENSATION

(71) Applicant: Aptiv Technologies Limited, St. Michael (BB)

(72) Inventors: Armin Talai, Nuremberg (DE); Rafal Michal Burza, Tarnów (PL); Sashi Praveen Kalli, Wuppertal (DE)

(73) Assignee: Aptiv Technologies AG, Schaffhausen (CH)

( * ) Notice: Subject to any disclaimer, the term of this patent is extended or adjusted under 35 U.S.C. 154(b) by 391 days.

(21) Appl. No.: 17/407,071

(22) Filed: Aug. 19, 2021

(65) Prior Publication Data

US 2023/0056655 A1 Feb. 23, 2023

(51) Int. Cl.
*G01S 7/40* (2006.01)
*B60W 50/00* (2006.01)

(52) U.S. Cl.
CPC ............ *G01S 7/40* (2013.01); *B60W 50/00* (2013.01); *B60W 2050/0063* (2013.01)

(58) Field of Classification Search
CPC ........ G01S 7/40; G01S 7/4017; G01S 7/4026; G01S 7/403; G01S 7/4034; G01S 7/4082;
(Continued)

(56) References Cited

U.S. PATENT DOCUMENTS 6,498,959 B1 * 12/2002 January ............... G01B 11/275
356/138
9,645,051 B2 * 5/2017 Jin ....................... G01M 17/007
(Continued)

FOREIGN PATENT DOCUMENTS

CN 107843883 3/2018
CN 207557464 6/2018
(Continued)

OTHER PUBLICATIONS

"Extended European Search Report", EP Application No. 22187289.8, dated Jan. 16, 2023, 12 pages.
(Continued)

*Primary Examiner* — Peter M Bythrow
(74) *Attorney, Agent, or Firm* — Harness, Dickey & Pierce, P.L.C.

(57) ABSTRACT

This document describes techniques for enabling radar system calibration with bistatic sidelobe compensation. Radar signals reflect off of a flat plate that changes orientation (e.g., elevation and/or azimuth angle) and position relative to a mounting position of a specific radar sensor being calibrated. For each radar sensor, measurements may be obtained across a range of translational positions of the flat plate. Highly accurate calibration errors are determined for each radar sensor this way. By calibrating radar systems repositioning the target during the data collection in this way, the prominence of any bistatic sidelobes appearing in measurements may be reduced or prevented, which may enable less-complex and more-accurate calibration of each unique radar system installation. An indication of each calibration error may be output for use in individually adjusting the mounting position of each specific radar sensor within a radar system.

20 Claims, 11 Drawing Sheets

(58) Field of Classification Search
CPC .............. G01S 13/931; B60W 50/00; B60W 2050/0063
See application file for complete search history.

(56) References Cited

U.S. PATENT DOCUMENTS

| | | | |
|---|---|---|---|
| 10,323,936 B2 * | 6/2019 | Leikert | G01B 11/2755 |
| 10,852,392 B2 | 12/2020 | Park | |
| 10,921,426 B2 * | 2/2021 | Tang | G01S 7/40 |
| 11,231,485 B2 * | 1/2022 | Okubo | G01S 13/867 |
| 11,390,289 B2 * | 7/2022 | Corghi | G01S 7/40 |
| 11,500,079 B2 * | 11/2022 | Lai | G01S 17/931 |
| 11,538,188 B1 * | 12/2022 | Cejka | G06T 7/80 |
| 11,674,634 B2 * | 6/2023 | Wang | F16M 11/24 73/1.81 |
| 2017/0212215 A1 * | 7/2017 | Hellinger | G01S 13/931 |
| 2019/0187249 A1 * | 6/2019 | Harmer | G01S 7/40 |
| 2020/0105018 A1 * | 4/2020 | Corghi | G05D 1/0246 |
| 2020/0130188 A1 * | 4/2020 | Lawrence | G01S 7/4972 |
| 2020/0142027 A1 * | 5/2020 | Lee | G01S 7/4086 |
| 2020/0319298 A1 * | 10/2020 | Wang | F16M 11/10 |
| 2020/0355792 A1 * | 11/2020 | Tang | G01S 13/865 |
| 2020/0400782 A1 * | 12/2020 | Tang | G01S 7/4017 |
| 2021/0048525 A1 * | 2/2021 | Lai | B25H 5/00 |
| 2021/0129856 A1 * | 5/2021 | Zack | G01S 7/4086 |
| 2021/0134079 A1 * | 5/2021 | Nee | G01S 7/4972 |
| 2021/0173060 A1 * | 6/2021 | Bartkowiak | F16B 1/00 |

FOREIGN PATENT DOCUMENTS

| | | |
|---|---|---|
| CN | 207636760 | 7/2018 |
| CN | 108594187 | 9/2018 |
| CN | 111929652 A | 11/2020 |
| DE | 102020003498 A1 | 12/2020 |
| DE | 102021107253 A1 | 3/2022 |

OTHER PUBLICATIONS

Oliveira, et al., "Comparison of Different Approaches for Detection and Treatment of Outliers in Meter Proving Factors Determination", Flow Measurement and Instrumentation, Feb. 6, 2016, 7 pages.

* cited by examiner

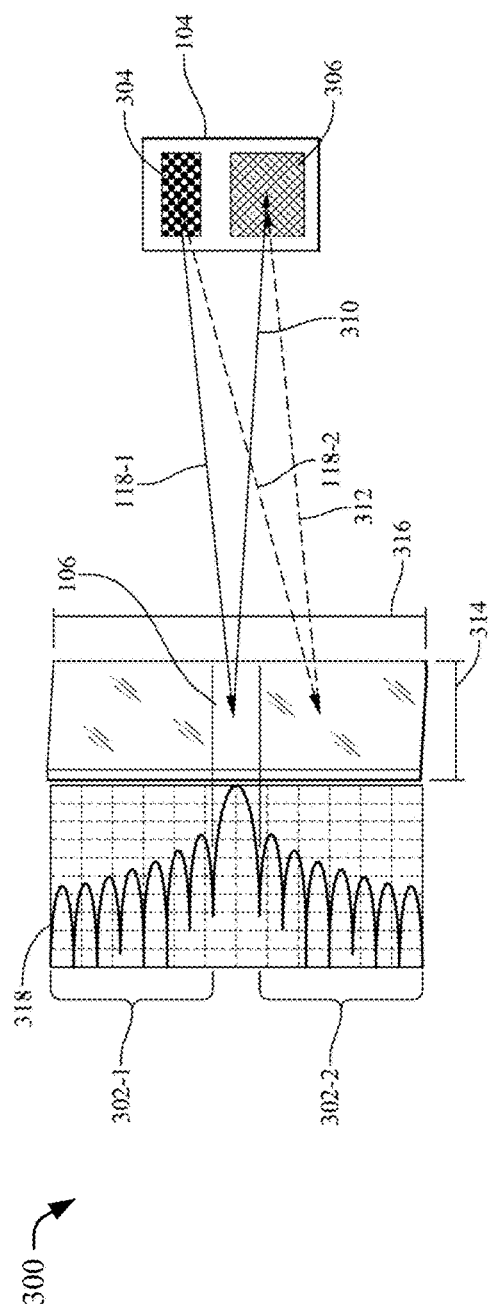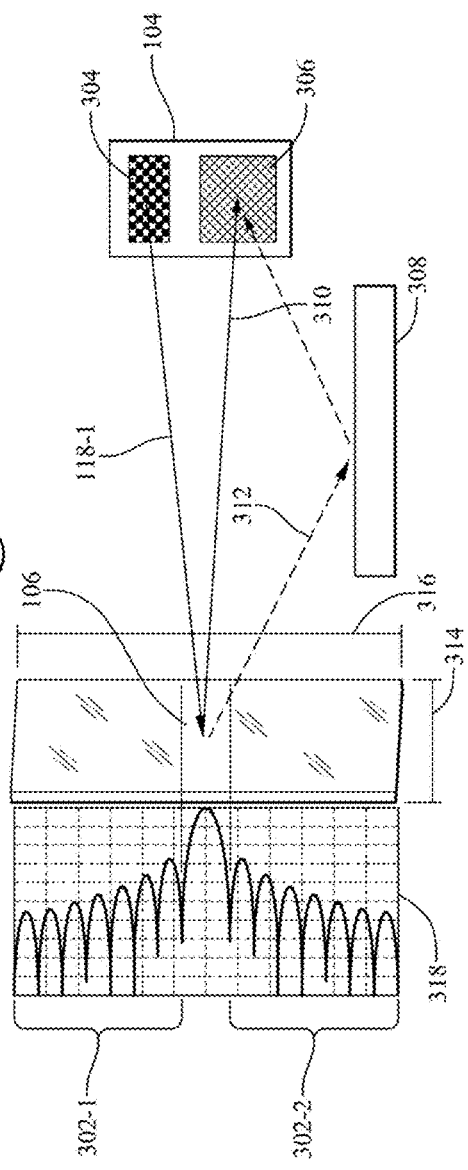

RADAR SYSTEM CALIBRATION WITH BISTATIC SIDELOBE COMPENSATION

BACKGROUND

A perception system for a vehicle (e.g., advanced safety or automated driving system) may rely on data collected from a radar system. As each installation of a radar system may be different, each radar system undergoes some calibration before it is operational. Traditional calibration may use readily available test environments with little to no customization and limited spatial constraints. These calibrations configure the radar system to determine azimuth angle and elevation angle of surrounding objects at an acceptable accuracy. However, radar system calibration faces many challenges, including minimizing or compensating for interference or noise related to bistatic side lobe reflections that often appear in the radar data during the calibration process. Bistatic side lobes can introduce errors in radar system calibration causing radar systems to report azimuth angle with an error of one degree or more. This calibration inaccuracy is often unacceptable as, at larger distances, even small angular deviations in azimuth can cause translational errors of multiple meters. In vehicle-safety systems or automated driving systems, errors of this magnitude can cause unsafe, uncomfortable, or erratic driving behaviors, requiring driver intervention or emergency overrides.

SUMMARY

This document describes techniques for enabling radar system calibration with bistatic sidelobe compensation. In one example, a method includes causing, by one or more processors, a flat plate target to be at a first position in a test environment relative to a mounting position of a particular radar sensor of a radar system arranged in the test environment for radar system calibration. The first position includes a respective elevation angle and a respective translational position relative to the mounting position of the particular radar sensor. The particular radar sensor collects first data indicative of first radar signals that reflect off of the flat plate target at the first position. Based on the first data, a first calibration error is determined for that particular radar sensor at the first position. One or more processors cause the flat plate target to be at one or more additional positions relative to the mounting position of the particular radar sensor. Each of the additional positions includes a respective elevation angle and a respective translational position relative to the mounting position of the particular radar sensor. The particular radar sensor collects additional data associated with each of the additional positions that are indicative of additional radar signals that reflect off of the flat plate target at each of the additional positions. Based on the additional data associated with each of the additional positions, an additional calibration error for each of the additional positions is determined. A combined calibration error for that particular sensor given the mounting position of the particular radar sensor within the radar system is determined based on the first calibration error for the first position and each additional calibration error for each of the additional positions. An indication of the combined calibration error is then output for use in compensating for the combined calibration error for the particular radar sensor within the radar system to calibrate the radar system.

In another example, a radar system calibration unit includes at least one processor configured to perform the above-summarized method. Other examples set forth herein are directed to systems and components, including systems with means for performing these methods.

This Summary introduces simplified concepts for radar system calibration with bistatic sidelobe compensation, for example, calibration of a vehicle radar system, as further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of radar system calibration with bistatic sidelobe compensation are described in this document with reference to the following figures:

FIG. 3-1 illustrates an example of bistatic sidelobe reflection due to radar system interference during radar system calibration;

FIG. 3-2 illustrates an example of bistatic sidelobe reflection due to external interference during radar system calibration;

FIG. 10-1 illustrates results of a radar system calibration without compensating for bistatic sidelobes;

FIG. 10-2 illustrates results of radar system calibration, with bistatic sidelobe compensation, in accordance with the techniques of this disclosure.

The same numbers are often used throughout the drawings to reference like features and components, including hyphenated numbers to designate variations of the like features and components previously shown.

DETAILED DESCRIPTION

Overview

Figure 1:
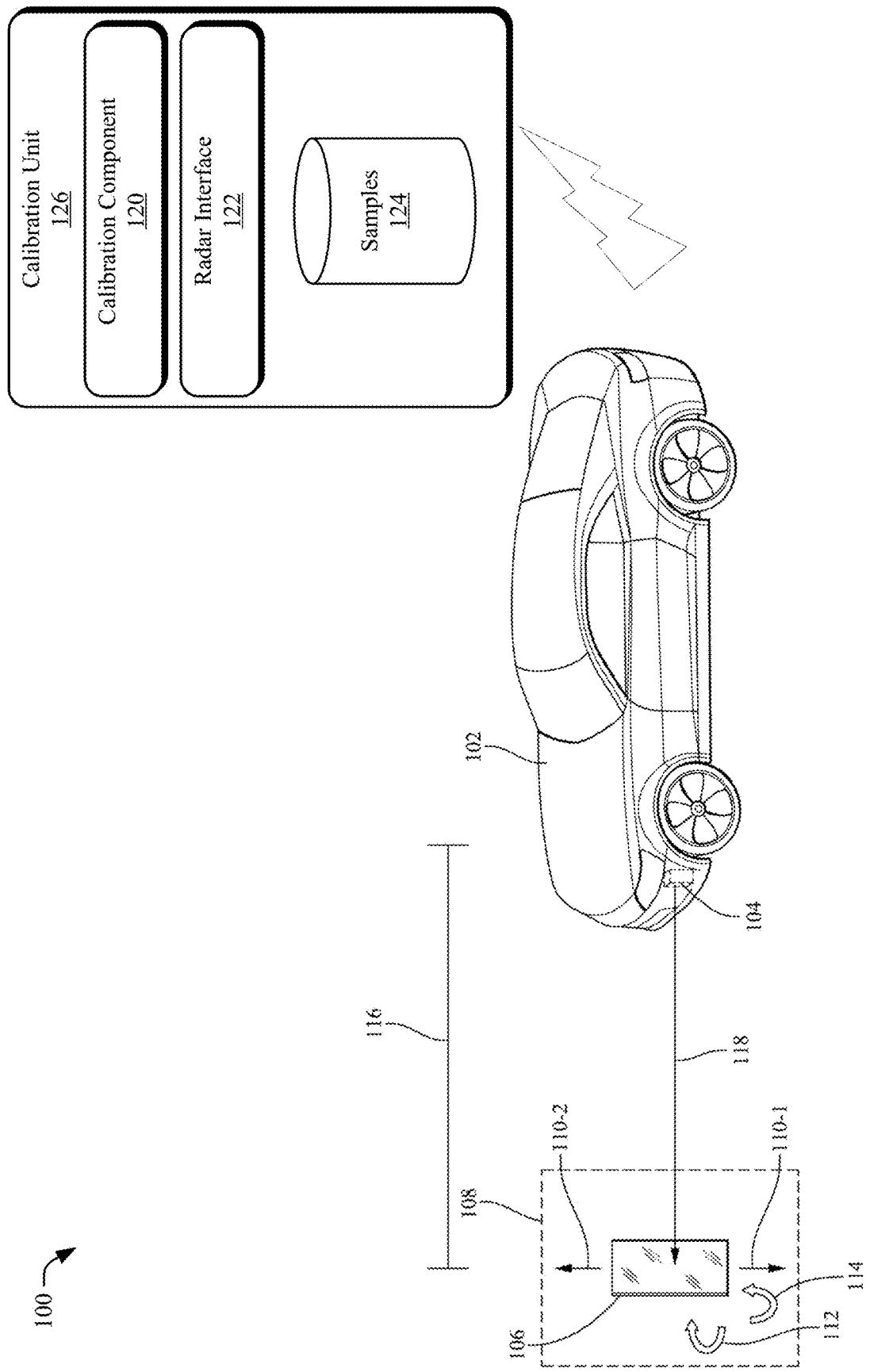
FIG. 1 illustrates an example test environment for calibration of a radar system, in accordance with the techniques of this disclosure.

This document describes techniques for enabling radar system calibration with bistatic sidelobe compensation. In one example of radar system calibration with bistatic sidelobe compensation, a radar system calibration unit determines a calibration error for each radar sensor by evaluating radar data obtained from reflections off a flat plate in a test environment that is configured to move between a range of positions relative to that radar sensor. The radar system calibration unit includes one or more processors, which can output information to cause the flat plate target to be located at a first position in the range. The first position of the flat plate is relative to a fixed mounting position of that radar sensor. The first position includes a respective translational position relative to the mounting position and may also include a respective elevation angle relative to the mounting position. The radar system calibration unit receives first radar data that is indicative of first radar signals received by the radar sensor having reflected off the flat plate target when at the first position. Based on the first data, a first calibration error is determined for the radar sensor at the first position of the flat plate. The process is repeated to receive additional data, including additional calibration errors determined for the radar sensor, measured from additional reflections off the flat plate when the flat plate is located at the additional positions. Based on the calibration errors determined across varying positions and/or elevations of the flat plate, a combined calibration error for each radar sensor given its relative mounting position within the radar system can be determined. An indication of the combined calibration error for one or more of the radar sensors of a radar system may be output (e.g., to a machine or human interpretable interface) to compensate for the combined calibration error due, at least in part, to inherent cross-talk, interference, or noise in further processing.

In some examples, radar system calibration may be improved by performing statistical analysis of the set of the first calibration error and each additional calibration error. A standard deviation calibration error can be determined for the particular radar sensor, usable to determine an outlier calibration error set and a remaining inlier calibration error set. Each calibration error from the inlier calibration error set can be combined to determine a more accurate combined calibration error for the particular radar sensor. Similarly, an indication of the more accurate combined calibration error can be output in place of the combined calibration error usable to compensate for the combined calibration error in further processing.

In addition, the techniques for radar system calibration with bistatic sidelobe compensation described in this document can be performed within common end-of-line (EOL) vehicle calibration environments. Further, the techniques described herein can utilize flat plates similar to those often used in calibration of other sensors, such as front-facing radar sensors, within the spatial constraints of EOL vehicle calibration environments. As a result, the techniques described herein provide a cost-efficient, widely operable, and accurate implementation of radar system calibration.

In this way, radar calibration is performed by causing radar signals to reflect off of a flat plate that changes orientation (e.g., elevation and/or azimuth angle) and position relative to a mounting position of a specific radar sensor being calibrated. For each radar sensor, measurements may be obtained across a range of translational positions of the flat plate. Highly accurate calibration errors are determined for each radar sensor this way. By calibrating radar systems while repositioning the target during the data collection in accordance with these techniques, the prominence of any bistatic sidelobes appearing in measurements may be reduced or prevented, which may enable less-complex and more-accurate calibration of each unique radar system installation. An indication of each calibration error may be output for use in individually adjusting the mounting position of each specific radar sensor within a radar system.

Operating Environment

FIG. 1 illustrates an example test environment 100 for calibration of a vehicle radar system, in accordance with the techniques of this disclosure. In the depicted test environment 100, a radar sensor 104 is located within a radar system of a vehicle 102. The radar sensor 104 may be one of multiple radar sensors of the radar system. For ease of description and clarity in the drawings, only a single radar sensor 104 is shown. Although illustrated as a passenger car, the vehicle 102 can represent other types of motorized vehicles (e.g., a passenger truck, motorcycle, bus, tractor, semi-trailer truck), non-motorized vehicles (e.g., a bicycle), railed vehicles (e.g., a train), watercraft (e.g., a boat), aircraft (e.g., an airplane), spacecraft (e.g., satellite), and the like.

The radar sensor 104 and one or more other radar sensors make up the radar system, which can be installed on, mounted to, or integrated with any vehicle or other moving platform, including moving machinery or robotic equipment. Components of the radar system can be arranged in a front, back, top, bottom, or side portion of the vehicle 102, within a bumper, integrated into a side mirror, formed as part of a headlight and/or taillight, or at any other interior or exterior location where objects require detection. For example, the radar sensor 104 is part of the radar system that is installed near a front corner or beneath a headlight. The vehicle 102 may include multiple radar systems, such as a first radar system and a second radar system, to provide a custom field-of-view (FOV) that encompasses a particular region of interest outside the vehicle 102. Acting as part of a perception system of the vehicle 102, the radar sensor 104 and all the other radar sensors of the radar system aids in driving the vehicle 102 by enabling advanced safety or autonomous-driving features.

The radar system can include the radar sensor 104 with other radar sensors, as well as a combination of hardware components and software components executing thereon to enable the radar sensors of the radar system to operate in a coordinated fashion to provide a particular FOV around the vehicle 102. For example, a computer-readable storage media (CRM) of the radar system may store machine-executable instructions that, when executed by a processor of the radar system, cause the radar system to output information about objects detected based on radar reflections obtained from the radar system FOV.

In this example embodiment, the radar sensor 104 comprises a corner radar sensor, for which the radar system calibration with bistatic sidelobe compensation described herein may be of particular benefit due to the large FOV of corner radar sensors. The test environment 100 includes a calibration unit 126 which utilizes a calibration component 120 to control a flat plate target 106 located a distance 116 away at a position 108 relative to a mounting position of the radar sensor 104. In an aspect, the flat plate target 106 is located at a distance 116 less than 2 meters from the mounting position of the radar sensor 104 and performs close-range radar system calibration due to spatial constraints in the test environment 100.

Additionally, the test environment 100 is configured to allow the flat plate target 106 to change position relative to the mounting position of the radar sensor 104 through translational movement 110 (e.g., translational movement 110-1 and translational movement 110-2) and elevation angular rotation 112. Optionally, the test environment 100 is configured to allow the flat plate target 106 to change position relative to the mounting position of the radar sensor 104 through azimuth angular rotation 114.

The radar sensor 104 outputs and receives radar signals 118, which may be transmitted by the radar sensor 104 and return to the radar sensor 104 after the radar signals 118 reflect off of the flat plate target 106 at its relative position 108. The radar sensor 104 is configured to capture samples 124 of radar data, indicative of the radar signals 118 that reflect off of the flat plate target 106. For example, the radar sensor 104 emits electromagnetic (EM) radiation when transmitting the radar signals 118 via antenna elements with a direction of departure (DOD). The radar sensor 104 expects to receive reflections within the radar signals 118 with a direction of arrival (DOA) that match the DOD of transmissions within the radar signals 118. The samples 124 include radar data indicative of the radar signals 118 that reflect off of the flat plate target 106. The samples 124 can be transmitted over a communication link 128 between the radar sensor 104, the radar system, and/or the vehicle 102.

The calibration unit 126 may be a remote computer, a test station, an onboard component of the vehicle 102, or other device or system used to collect and process calibration data for calibrating radar. The calibration unit 126 includes a radar interface 122 at which the calibration unit 126 receives the samples 124 collected by the radar sensor 104 via the radar interface 122. The calibration unit further includes a calibration component 120 configured to determine a calibration error specifically for the radar sensor 104 when the radar sensor 104 is mounted at the relative position 108 within the radar system.

For example, the calibration unit 126 causes the flat plate target 106 to be at a first position (e.g., position 108) in the test environment 100 relative to the mounting position of the radar sensor 104 of the radar system. The first position includes a respective elevation angle (e.g., within a range of about zero degrees) and a respective translational position relative to the mounting position of the radar sensor 104. The flat plate target 106 is moved to the respective translational position through translational movement 110 and separately or simultaneously moved to the respective elevation angle through elevation angular rotation 112.

The calibration unit 126 receives first radar data, collected from the radar sensor 104, indicative of first radar signals (e.g., radar signals 118) that reflect off of the flat plate target 106 at the first position. Based on the first radar data, the calibration unit 126 determines a first calibration error for the radar sensor 104 at the first position. The calibration unit 126 then causes the flat plate target 106 to be at one or more additional positions relative to the mounting position of the radar sensor 104, each of the additional positions including a respective elevation angle and a respective translational position relative to the mounting position of the radar sensor 104. The calibration unit 126 receives additional data, collected from the radar sensor, associated with each of the additional positions and indicative of additional radar signals that reflect off of the flat plate target 106 at each of the additional positions. Based on the additional data associated with each of the additional positions, an additional calibration error for each of the additional positions is determined. The calibration unit 126 combines the first calibration error and each additional calibration error to determine a combined calibration error for the radar sensor 104 given a fixed mounting position of the radar sensor 104 within the radar system. An indication of the combined calibration error may be output for use in repositioning the radar sensor 104 within the radar system to reduce the calibration error to calibrate the radar system.

In some examples, the first position and each of the additional positions include a respective azimuth angle relative to the mounting position of the radar sensor 104, in addition to, or instead of, the respective translational position. The flat plate target 106 can move across a range of positions, including shifts in translational position, elevation angle, or azimuth angle to improve radar system calibration or calibrate a radar system with a particular FOV. If azimuth angle is used, the flat plate target 106 may be moved to a respective azimuth angle through azimuth angular rotation 114. There may be some common values shared between them. In general, however, the respective elevation angle, the respective translational position, and the respective azimuth angle of each of the first position and the additional positions is unique (at least to that radar sensor 104).

While FIG. 1 illustrates the flat plate target 106 in the center of the FOV of the radar sensor 104, it should be noted that the flat plate target 106 may be placed at any location within the FOV of the radar sensor 104. This includes placing the flat plate target 106 at or near the center of the FOV of the radar sensor 104 to calibrate the radar sensor 104 at boresight, or placing the flat plate target 106 at or near the border of the FOV of the radar sensor 104 to calibrate the radar sensor 104. Generally, it is preferred that the radar sensor 104 is calibrated by positioning the flat plate target 106 at or near (e.g., within a small distance of) a boresight of the radar sensor 104, as this may provide for a better averaging of bistatic sidelobes. In other words, positioning the flat plate target 106 near the boresight of the radar sensor 104 can cause any bistatic sidelobes to appear symmetrical about one or more central axis of the FOV.

Figure 2:
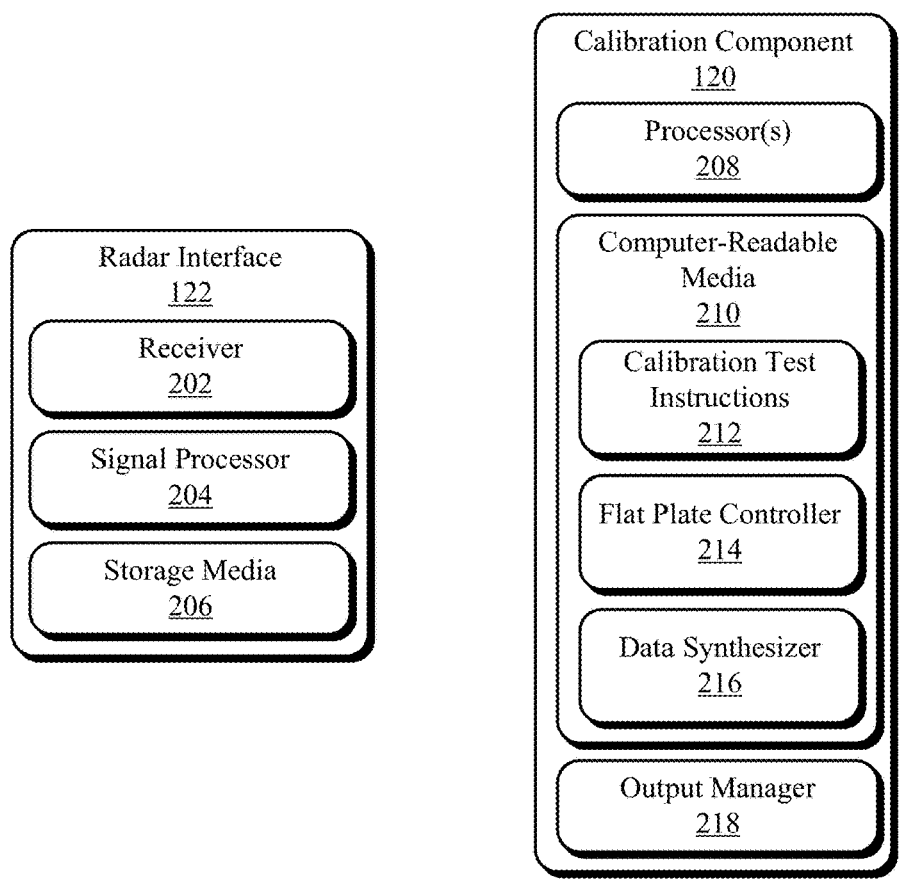
FIG. 2 illustrates a detailed example of the radar interface and calibration component of FIG. 1.

FIG. 2 illustrates a detailed example of the radar interface 122 and calibration component 120 of FIG. 1. Specifically, the radar interface 122 includes a receiver 202, a signal processor 204, and a storage media 206. The radar interface 122 is configured to receive sampled data (e.g., the samples 124) collected by a radar sensor (e.g., the radar sensor 104). The sampled data may be provided to the radar interface 122 through hardware components, software components, or a combination thereof. For example, the sampled data may be transmitted to radar interface 122 wirelessly through a wireless transmit-receive setup. In this example, the receiver 202 can be used to receive the sampled data transmitted to the radar interface 122, and a signal processor 204 may be used to demodulate and interpret the received signal into the sampled data. The sampled data may then be stored within storage media 206 to be processed later for radar system calibration. In another example, the sampled data may be transmitted through a wired hardware connection between the radar system and the radar interface. The sampled data may be transmitted from the radar system across the wired connection and stored in the storage media 206 by the radar interface 122.

The calibration component 120 includes computer-readable media (CRM) 210, which stores machine-executable calibration test instructions 212 that, when executed by one or more processors 208, perform the radar system calibration techniques of this disclosure. Additionally, the computer-readable media may include a flat plate controller 214 and a data synthesizer 216. The flat plate controller 214 may include machine-executable instructions that control positioning of a flat plate based on the desired position provided by the calibration test instruction 212. The data synthesizer 216 may include machine-executable instructions that, when executed by the one or more processors 208, perform statistical analysis of the sampled data to determine a calibration error for a radar sensor (e.g., radar sensor 104) within a radar system. The calibration component 120 may also include an output manager 218, which manages the output of a calibration error usable to adjust the mounting position of the radar within the radar system to calibrate the radar system. For example, the output manager 218 may provide the calibration error to a controller configured to provide machine-executable instructions to correct the calibration error for the radar sensor within the radar system.

Effect of Bistatic Sidelobes

FIG. 3-1 illustrates an example of bistatic sidelobe reflection due to radar system interference during radar system calibration. As illustrated, FIG. 3-1 includes a spectrum response 318 of the radar sensor 104, which contains transmit arrays 304 and receive arrays 306. The transmit arrays 304 transmit radar signals 118, which reflect off of the flat plate target 106. In an aspect, the flat plate target 106 has a planar surface including a length dimension 314 and a width dimension 316 covering multiple degrees in azimuth and elevation angle. As a result, the flat plate target 106 cannot be treated as a point target, and the reflected radar signals 118 include a specular reflection 310 and sidelobe reflections 312. In an aspect, the radar sensor 104 transmits multiple radar signals 118 (e.g., radar signals 118-1 and radar signals 118-2) at different DODs.

In FIG. 3-1, the radar signals 118-1 reflect off of the flat plate target 106 as the specular reflection 310, which is intended to be collected by the receive arrays 306 of the radar sensor 104. However, radar signals 118-2 are transmitted at a different DOD and reflect off of the flat plate target 106, appearing as the sidelobe reflections 312 collected by the receive arrays 306. The sidelobe reflections 312 are parasitic reflections, degrading the specular reflection 310 and providing noise 302 (e.g., noise 302-1 and noise 302-2) as shown in the spectrum response 318. As a result, the noise 302 caused by the sidelobe reflections 312 may deteriorate the accuracy of azimuth angle reporting by the radar sensor 104.

The radar sensor 104 has a particular resolution and gain pattern. For example, the radar sensor 104 may have a symmetric gain pattern and have high resolution. In this example, a shift in azimuth angle reporting due to sidelobe reflections 312 may be lesser as the symmetric gain pattern and high resolution enable better identification and cancelation of sidelobe reflections when collecting radar signals. The radar sensor 104 may have an asymmetric gain pattern and low resolution, which may result in a large shift in azimuth angle reporting. In this example, the sidelobe reflections 312 are less likely to cancel out, and the low resolution of the radar sensor 104 may degrade the specular reflection 310. Thus, the sidelobe reflections 312 are more likely to shift the azimuth angle reporting beyond the required azimuth angle accuracy.

FIG. 3-2 illustrates an example of bistatic sidelobe reflection interference from surrounding objects during radar system calibration. FIG. 3-2 illustrates the spectrum response of the radar sensor 104. However, FIG. 3-2 includes reflective objects near the flat plate target 106, which may reflect the radar signals 118 transmitted from the transmit arrays as sidelobe reflections 312 back to the receive arrays 306 of the radar sensor 104. The sidelobe reflections 312 deteriorate the collection of the specular reflection 310 and introduce noise 302 to the spectrum response 318 of the radar sensor. As a result, the noise 302 caused by the sidelobe reflections may deteriorate the accuracy of azimuth angle reporting by the radar sensor 104.

By locating the flat plate target 106 at different positions relative to the radar sensor 104, different sidelobe reflections 312 may be captured by the radar sensor 104. By collecting a variation in sidelobe reflections 312, multiple calibration errors determined from multiple radar data collected at different positions may incorporate different effects of sidelobe reflections 312. When combined, the multiple calibration errors may average out individual calibration errors affected by sidelobe reflections 312 and provide a more accurate calibration error indicative of the specular reflection 310. As a result, the radar sensor 104 may be adjusted more accurately, and the radar system may have improved calibration.

Figure 4:
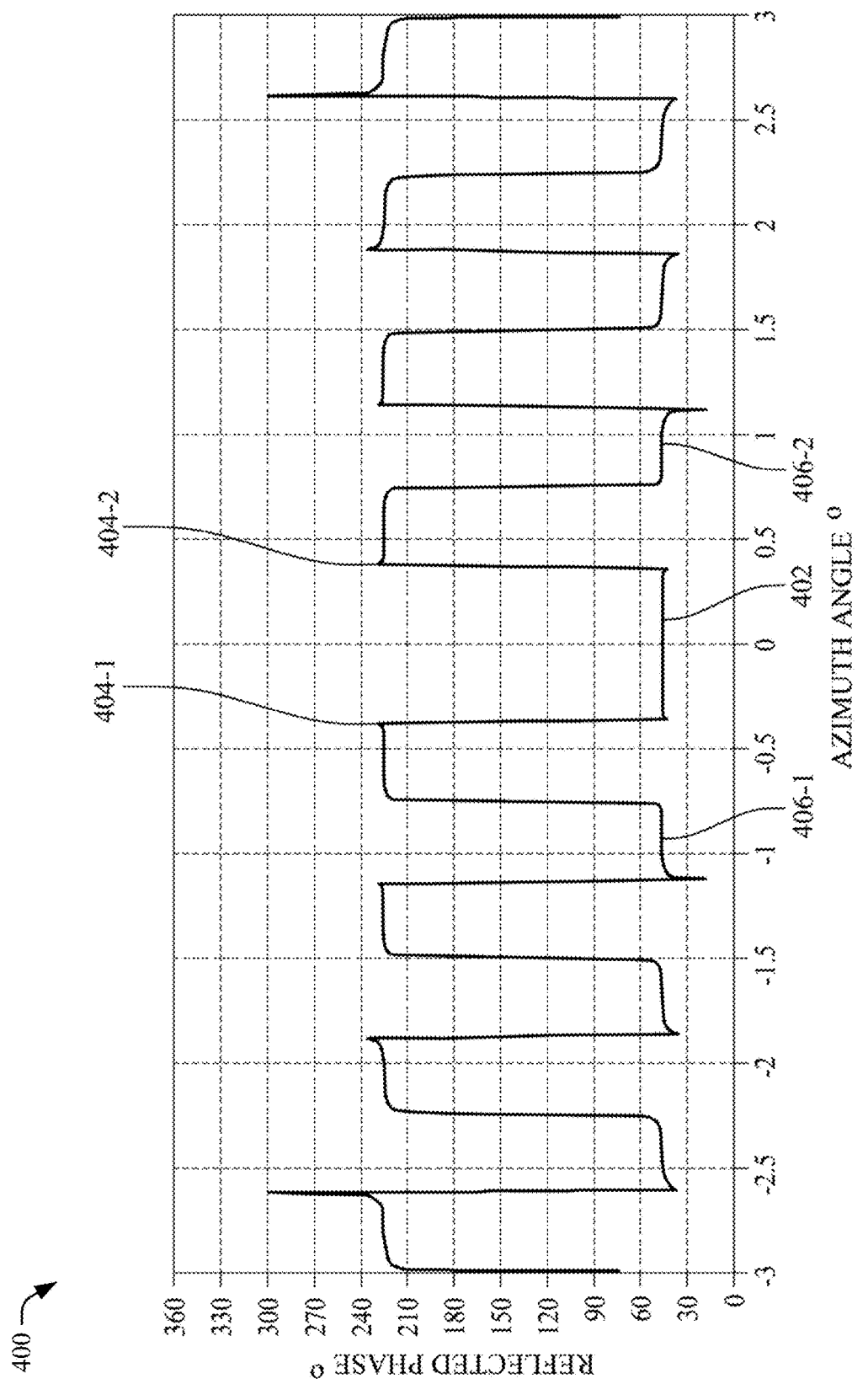
FIG. 4 illustrates an example phase response of a radar sensor during radar system calibration where bistatic sidelobe reflections are present.

FIG. 4 illustrates an example phase response 400 of a radar sensor (e.g., radar sensor 104) during radar system calibration where bistatic sidelobe reflections are present. The phase response 400 is provided by the specular reflection (e.g., specular reflection 310) represented as a flat phase area 402. Alternatively, phase jumps 404 (e.g., phase jump 404-1 and phase jump 404-2) of 180 degrees are present at the nulls. The phase response 400 additionally shows phase distortion 406 (e.g., phase distortion 406-1 and phase distortion 406-2) caused by sidelobe reflections (e.g., sidelobe reflections 312). The sidelobe reflections can have amplitude levels of up to 13 dB below the specular reflection, allowing the phase distortion 406 to change the detected phases at receive arrays (e.g., receive arrays 306). As a result, the azimuth angle reported by the radar sensor may contain errors that exceed the required azimuth angle accuracy.

Further, the phase response 400 has a symmetric phase response due to a symmetric gain pattern of the radar sensor used to receive the reflected radar signals. As a result, the effects of the phase distortion 406 may be lesser as the phase distortion 406 occurs to each side of the specular reflection. However, in another example, the phase response 400 is indicative of reflected radar signals collected from a radar sensor with an asymmetric gain pattern. In this example, the phase response 400 may not be symmetric, and the phase distortion 406 caused by the sidelobe reflections may have a greater effect on azimuth angle reporting.

Flat Plate Position

Figure 5:
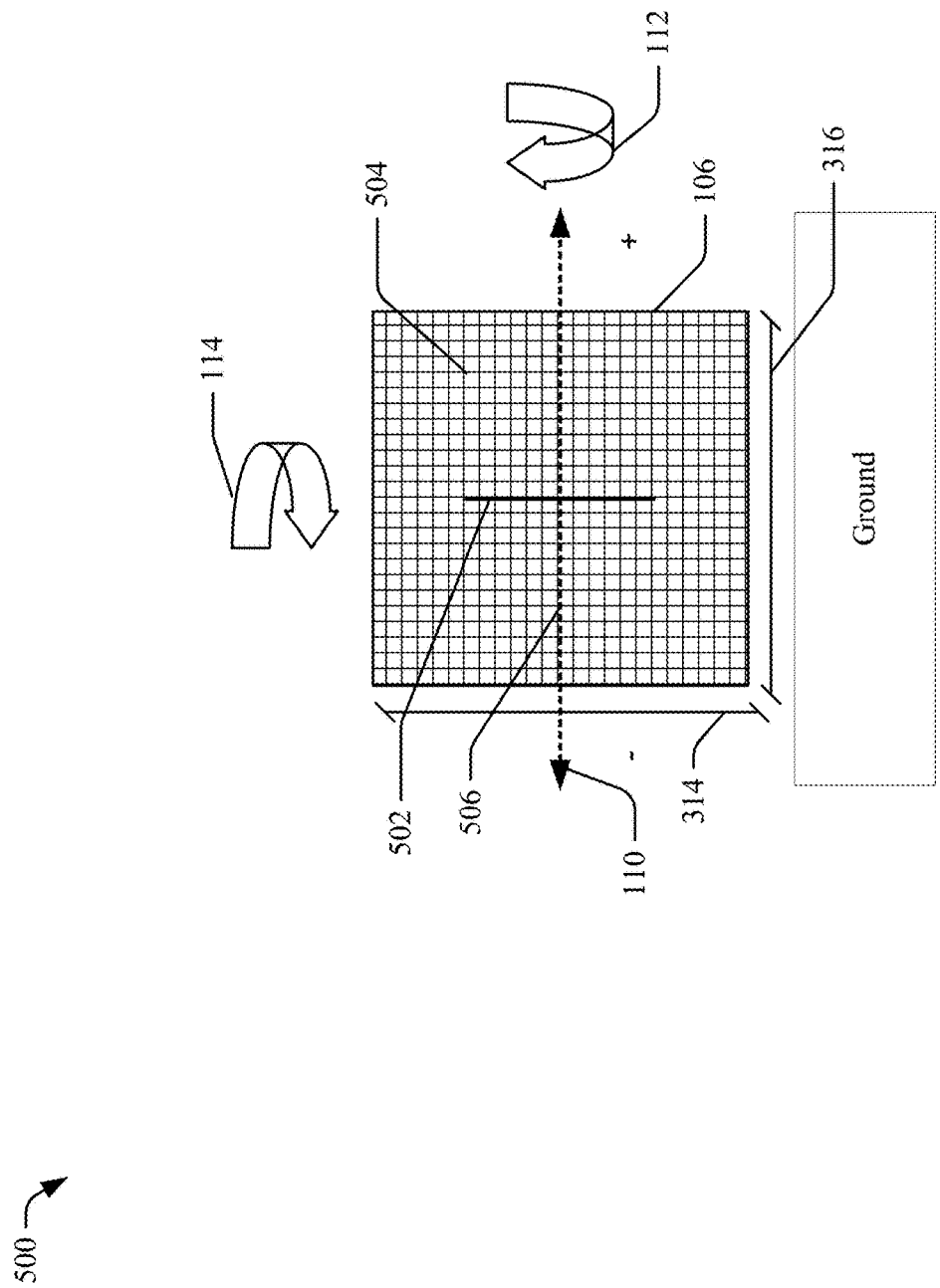
FIG. 5 illustrates a conceptual view of a target during radar system calibration with bistatic sidelobe compensation, in accordance with the techniques of this disclosure.

FIG. 5 illustrates an example of radar system calibration 500 with bistatic sidelobe compensation in accordance with the techniques of this disclosure. The flat plate target 106 contains a center 502 and is movable through translational movement 110 and elevation angular rotation 112 at a centerline 506 of the length dimension 314. Optionally, the flat plate target 106 may change position through azimuth angular rotation 114 about the center 502. The flat plate target 106 contains a grid 504 of the length dimension 314 and the width dimension 316.

In an aspect, radar system calibration with bistatic sidelobe compensation can be performed utilizing the flat plate target 106. For example, the flat plate target 106 contains a grid 504 of the length dimension 314 and the width dimension 316. The center 502 of the flat plate target 106 represents a center 502 of the width dimension 316 of the flat plate target 106. The flat plate target also contains a centerline 506 of the length dimension 314. The grid 504 is centered about the center 502 of the width dimension 316 and the centerline 506 of the length dimension. The flat plate target 106 is positioned at a first position relative to the mounting position of a radar sensor where a specular reflection reflects off of a point on the grid 504, which intersects the centerline 506 and the center 502. The radar sensor is used to collect first data indicative of first radar signals that reflect off of the flat plate target 106 at the first position.

Based on the first data, a first calibration error is determined for the radar sensor at the first position. The flat plate target 106 is moved to an additional position relative to the mounting position of the radar sensor through translational movement 110 along the centerline 506. The additional position has a next point on the grid 504 at the centerline 506, where a specular reflection reflects. The radar sensor is then used to collect additional data indicative of additional radar signals that reflect off the flat plate target 106 at the additional position. Based on the additional data, an additional calibration error is determined for the radar sensor at the additional position.

The flat plate target 106 may be moved to more additional positions containing points on the grid 504 along the centerline 506 at which a specular reflection reflects. In an aspect, the additional positions may include all points on the grid 504 along the centerline 506. Due to the change in position of the flat plate target 106 relative to the mounting position between each of the first and additional positions, the data collected at each position can include a different effect from sidelobe reflections. As a result, the calibration error for the radar sensor at each position may be determined from the different effects of sidelobe reflections. Each calibration error for the radar sensor at each position can be combined to produce a combined calibration error for the radar sensor. Due to the difference in the effects of sidelobe reflections in each of the calibration errors, the combined calibration error is less likely to be affected by a single calibration error with large effects due to sidelobe reflections. As a result, the combined calibration error may be usable in adjusting the radar sensor to better calibrate the radar system.

To collect sidelobe reflections with appropriate variation at each of the positions, it may be beneficial to collect first data and additional data at points with small translational movement 110 between each of the first position and additional positions. As a result, the grid 504 may be spaced no more than 3 mm apart along the width dimension 316 of the flat plate target 106.

In addition, each of the first and additional positions may include a respective elevation angle relative to the mounting position of the radar sensor. The respective elevation angle can be changed for each of the first and additional positions through elevation angular rotation 112 at the centerline 506. For example, the first position has a respective elevation angle of 0 degrees relative to the mounting position of the radar sensor. The flat plate target 106 is then moved to the additional position, which has a respective elevation angle of 1 degree relative to the mounting position of the radar sensor. The flat plate target 106 may be moved to more additional positions, each with a different respective elevation angle relative to the mounting position of the radar sensor. By changing the respective translational position and the respective elevation angle at each of the first and additional positions, the radar system can be calibrated simultaneously for azimuth angle reporting and elevation angle reporting.

To collect data usable to calibrate a radar sensor within a radar system for elevation angle reporting, it may be beneficial to collect first data and additional data at points with small elevation angular rotation 112 between each of the first position and additional positions. As a result, the first and additional data may be collected at first positions and additional positions, each with a respective elevation angle between the range of relative to the mounting position of the radar sensor within the radar system. For example, the range may be −5 degrees to 5 degrees, −4 degrees to 4 degrees, or any other range.

In another example, each of the first and additional positions may include a respective azimuth angle relative to the mounting position of the radar sensor. The respective azimuth angle can be changed for each of the first and additional positions through azimuth angular rotation 114 at the center 502 of the width dimension 316 of the flat plate target 106. For example, the first position has a respective azimuth angle of 0 degrees relative to the mounting position of the radar sensor. The flat plate target 106 is then moved to the additional position, which has a respective azimuth angle of 1 degree relative to the mounting position of the radar sensor. By changing the respective elevation angle and the respective azimuth angle at each of the first and additional positions, the radar system can be calibrated simultaneously for azimuth angle reporting and elevation angle reporting.

Iterative Statistical Analysis

Once a data calibration error for a radar sensor has been determined for each of the first position and the additional positions, the calibration errors can be combined to determine a combined calibration error for the radar sensor. In addition, iterative statistical analysis may be performed to determine a more accurate combined calibration error for the radar sensor. The iterative statistical analysis utilizes data filtering from a first iteration to receive a more accurate combined calibration error in a second iteration.

Figure 6:
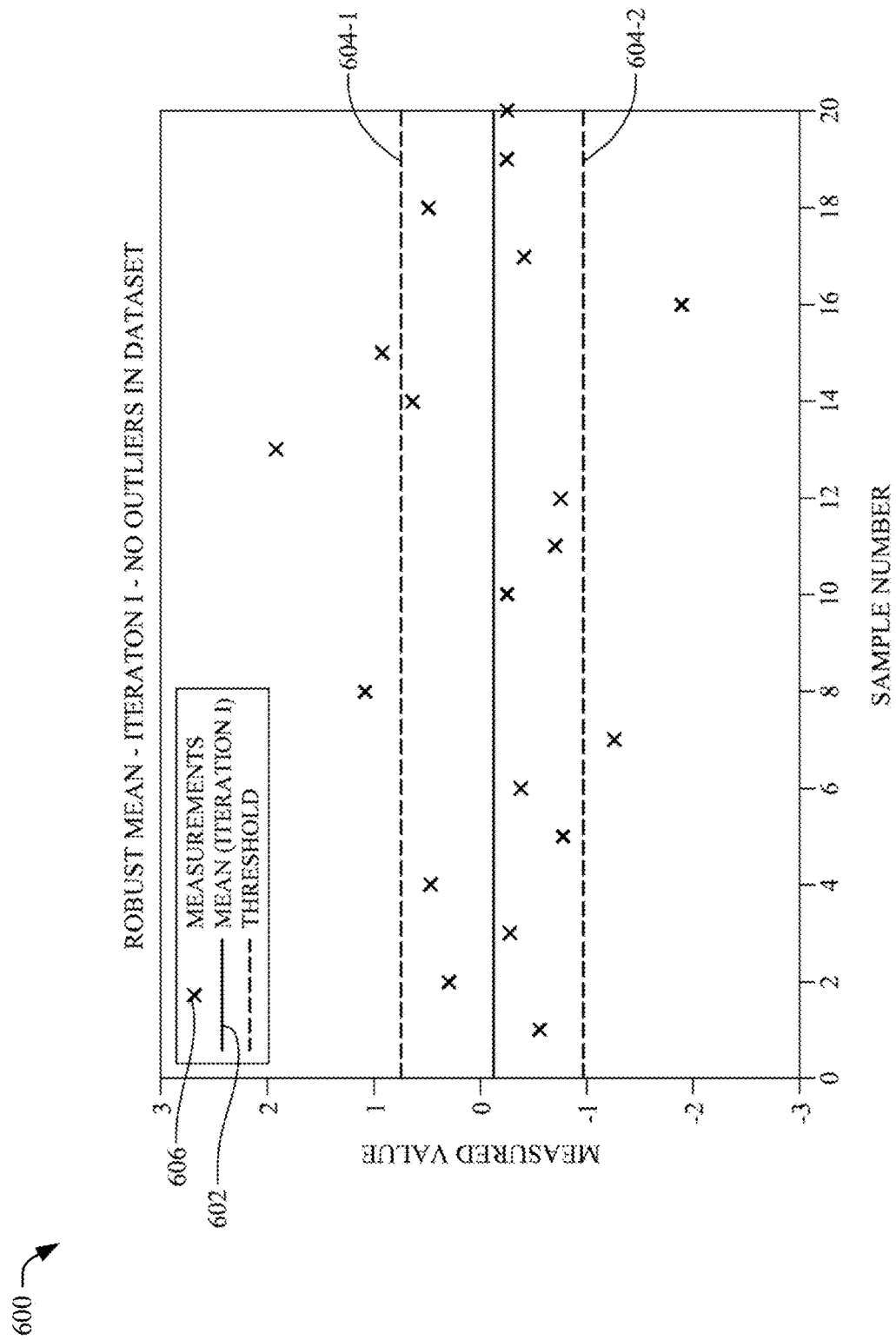
FIG. 6 illustrates example radar data during a first iteration of radar system calibration with bistatic sidelobe compensation where no outliers are present.

FIG. 6 illustrates an example radar data 600 obtained during a first iteration of radar system calibration with bistatic sidelobe compensation where no outliers are present. In the first iteration, the radar data 600 includes measurements 606 that are plotted for each of the first calibration error and the additional errors determined from each of the first data and additional data collected by a radar sensor. A mean 602 is calculated for the measurements 606 and represents a combined calibration error for the radar sensor based on the first calibration error and the addition calibration errors. In addition, a standard deviation calibration error is calculated, usable to determine a threshold 604 (e.g., upper threshold 604-1 and lower threshold 604-2). In an aspect, the upper threshold 604-1 is determined through a scaled addition of the standard deviation calibration error and the mean 602. Similarly, the lower threshold 604-2 may be determined through a scaled subtraction of the standard deviation calibration error and the mean 602. For example, the upper threshold 604-1 may be defined as the mean 602 plus twice the standard deviation calibration error, and the lower threshold 604-2 may be defined as the mean 602 minus twice the standard deviation calibration error. It is important to note that this is but one example method usable to calculate the threshold 604. Other methods may include different scaling of the standard deviation calibration error for the upper threshold 604-1 or the lower threshold 604-2.

Figure 7:
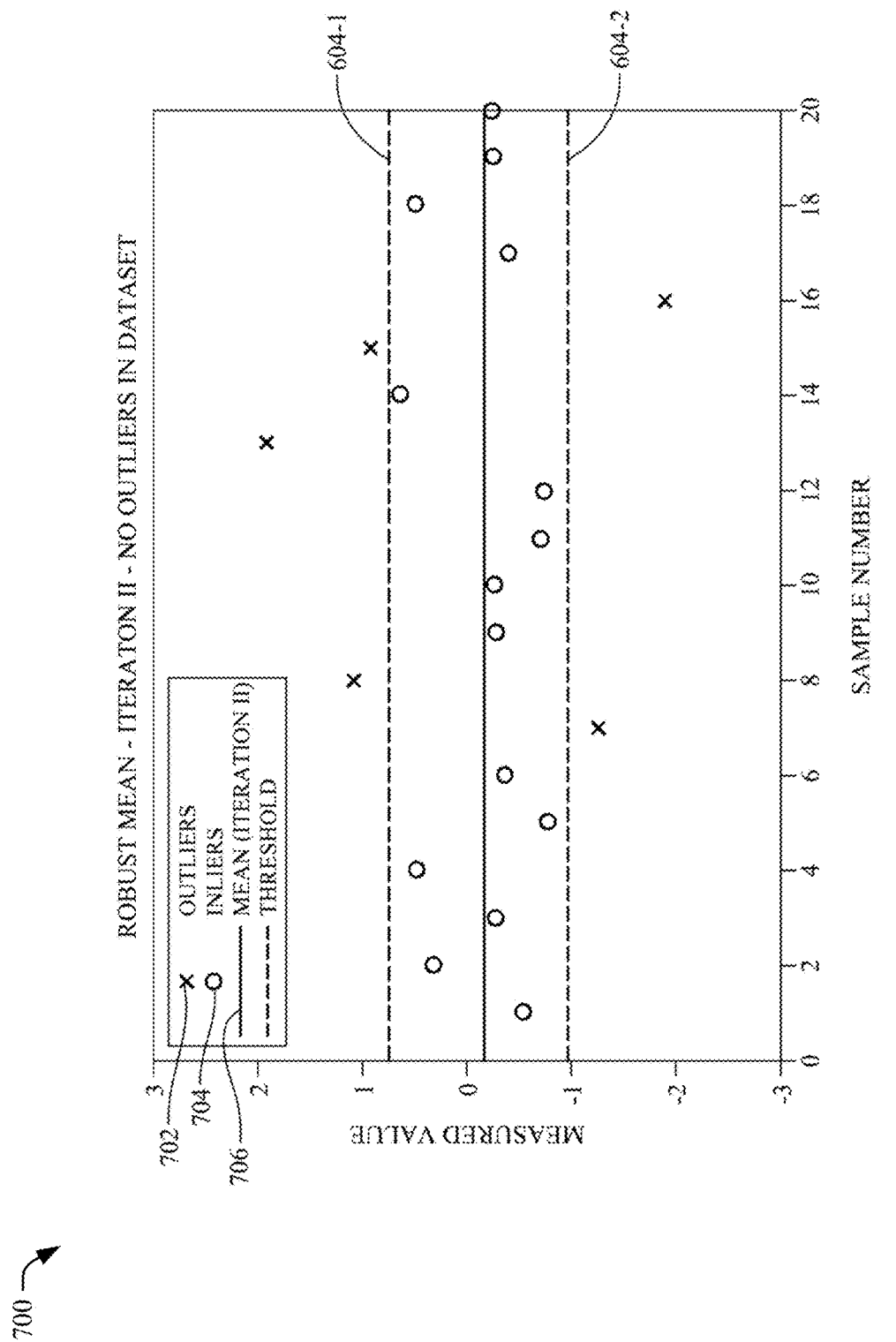
FIG. 7 illustrates example radar data during a second iteration of radar system calibration with bistatic sidelobe compensation following the first iteration shown in FIG. 6.

FIG. 7 illustrates an example of radar data 700 during a second iteration of radar system calibration with bistatic sidelobe compensation where no outliers are present in the measurements 606 of FIG. 6. In the second iteration, the threshold 604 can be used to classify the measurements 606 of FIG. 6 into a set of outliers 702 and a remaining set of inliers 704 within the radar data 700. Each of the measurements 606 of FIG. 6 determined to be outside of a range between the upper threshold 604-1 and the lower threshold 604-2 can be classified as outliers 702 and grouped in a set of the outliers 702. The measurements 606 of FIG. 6 not classified as outliers 702 can be classified as inliers 704 and placed in a set of the inliers 704. A robust mean 706 for the second iteration is then determined from each of the inliers 704 in the set of the inliers 704. As a result, the robust mean 706 may be a more accurate calibration error for a radar sensor when compared to the mean of the first iteration (e.g., mean 602).

It should be noted that in FIG. 6 and FIG. 7, the measurements 606 are largely symmetric with respect to the mean of the first iteration (e.g., mean 602) and contain no clear outliers (e.g., a measurement that deviates greatly from the remaining measurements). As a result, the robust mean of the second iteration (e.g., robust mean 706) and the mean of the first iteration (e.g., mean 602) have a small difference. In such instances, iterative statistical analysis may have a lesser effect than instances where outliers are present and the measurements are asymmetric.

Figure 8:
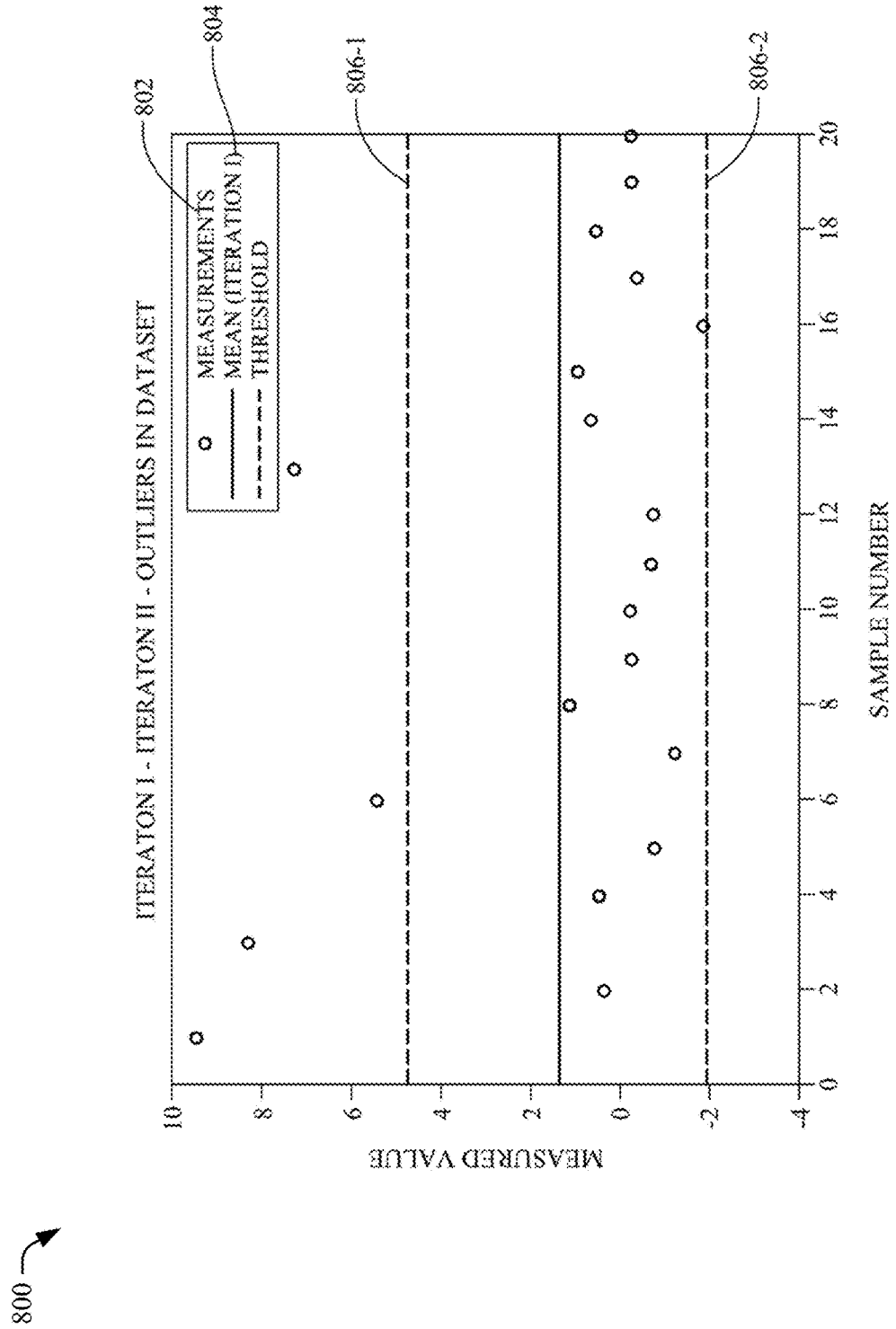
FIG. 8 illustrates example radar data during a first iteration of radar system calibration with bistatic sidelobe compensation where outliers are present.

FIG. 8 illustrates an example of radar data 800 during a first iteration of radar system calibration with bistatic sidelobe compensation where outliers are present. In the first iteration, measurements 802 are plotted for each of the first calibration error, and the additional errors are determined from the radar data 800 collected by a radar sensor. A mean 804 is calculated for the measurements 802 and represents a combined calibration error for the radar sensor based on the first calibration error and the addition calibration errors. In addition, a standard deviation calibration error is calculated, usable to determine a threshold 806 (e.g., upper threshold 806-1 and lower threshold 806-2) as shown through descriptions of FIG. 6 and FIG. 7. It should be noted that the measurements 802 are not symmetric about the mean 804 and individual measurements show a large deviation from the set of the measurements 802.

Figure 9:
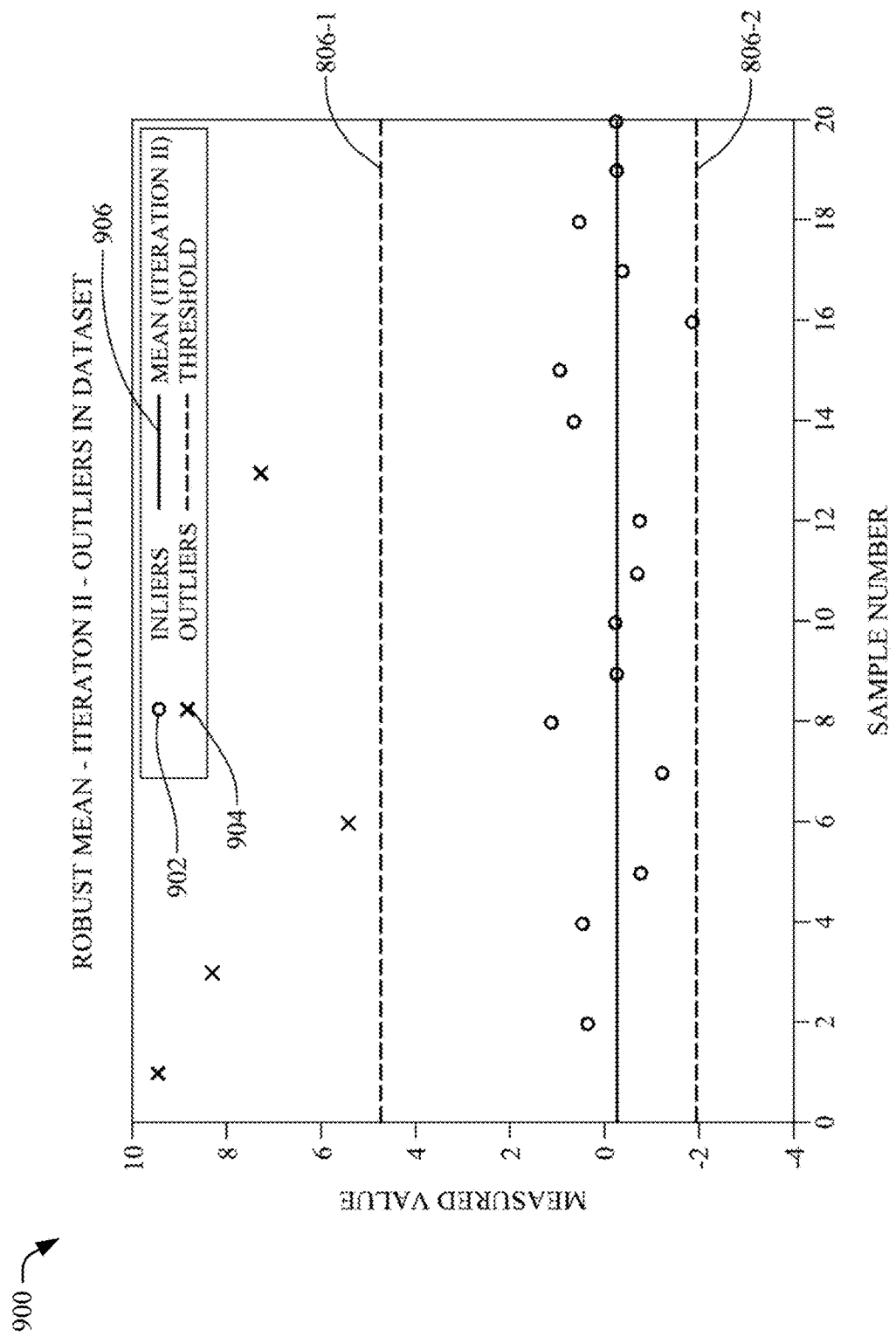
FIG. 9 illustrates example radar data during a second iteration of radar system calibration with bistatic sidelobe compensation following the first iteration shown in FIG. 8.

FIG. 9 illustrates an example of radar data 900 during a second iteration of radar system calibration with bistatic sidelobe compensation where outliers are present. In the second iteration, the threshold 806 can be used to classify the measurements 802 of FIG. 8 into a set of outliers 902 and a remaining set of inliers 904 that make up the radar data 900. Each of the measurements 802 of FIG. 8 determined to be outside of a range between the upper threshold 806-1 and the lower threshold 806-2 are classified as outliers 902 and grouped in a set of the outliers 902. The measurements 802 of FIG. 8 not classified as outliers 902 are classified as inliers 904 and placed in a set of the inliers 904. A robust mean 906 for the second iteration is then determined from each of the inliers 904 in the set of the inliers 904. As a result, the robust mean 906 may be a more accurate calibration error for a radar sensor when compared to the mean of the first iteration (e.g., mean 804). For example, in the second iteration, the outliers 902 were located above the upper threshold 806-1 due to the effects of sidelobe reflections. These outliers 902 were filtered out, and the robust mean 906 is a lower value in comparison to the mean of the first iteration (e.g., mean 804).

In comparison to the mean of FIG. 6 (e.g., mean 602) and the robust mean of FIG. 7 (e.g., robust mean 706), the robust mean 906 has a larger deviation from the mean of the first iteration (e.g., mean 804). As such, iterative statistical analysis may be more effective for asymmetric measurements containing outliers, as in the measurements of FIG. 8 (e.g., measurements 802).

Performance of Radar System Calibration

Figures 1, 10:
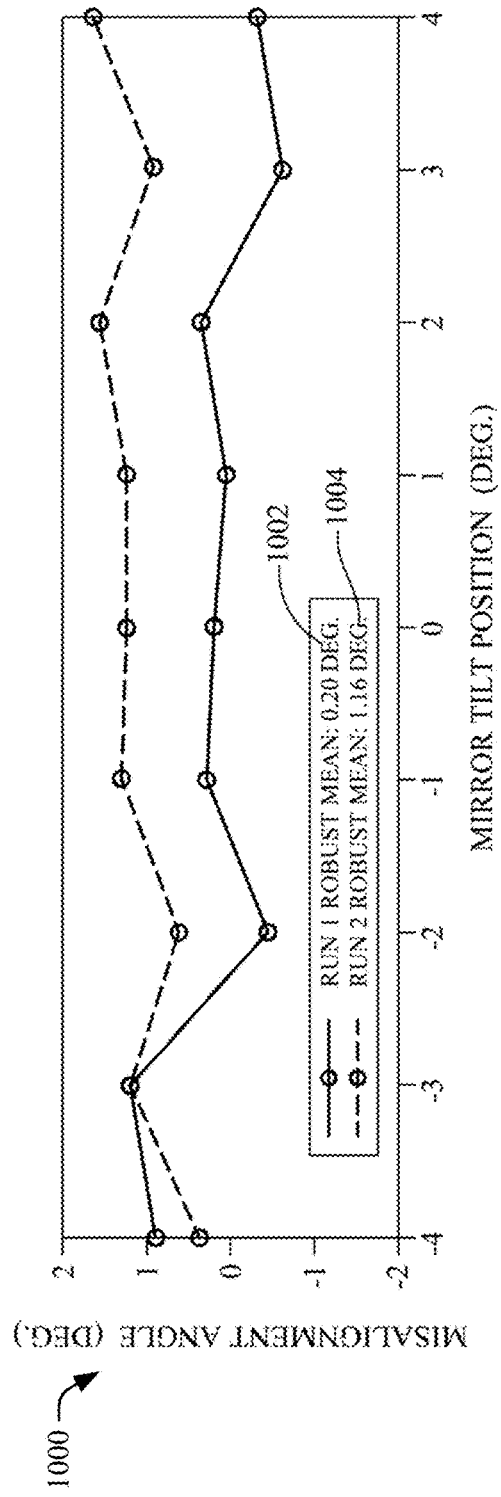
Figures 2, 10:
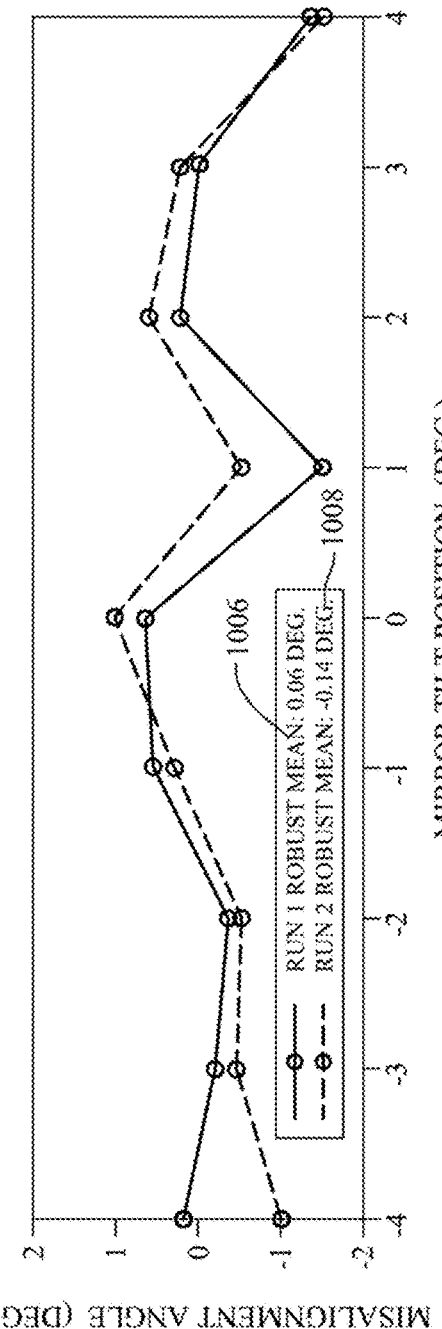

FIG. 10-1 illustrates the performance of radar system calibration without bistatic sidelobe compensation. For a first run, a flat plate target was placed at a first position relative to a mounting position of a radar sensor. The first position includes a translational position and a respective elevation angle of −4 degrees. First radar data is collected indicative of radar signals reflecting off of the flat plate target at the first position relative to the mounting position of the radar sensor and usable to determine a first calibration error for the radar sensor. The flat plate target is then placed at a second position relative to the mounting position of the radar sensor. The second position includes a same translational position as the first position and a respective elevation angle of −3 degrees. Second radar data is collected indicative of radar signals reflecting off of the flat plate target at the second position relative to the mounting position of the radar sensor and usable to determine a second calibration error for the radar sensor. Seven additional radar data are collected indicative of radar signals reflecting off of the flat plate target at seven additional positions, which include the same translational position as the first position and the second position and have respective elevation angles of −2, −1, 0, 1, 2, 3, and 4 degrees respectively. A calibration error is determined for each of the seven additional radar data, and each of the first calibration error, the second calibration error, and the seven additional calibration errors are plotted with respect to their respective elevation angle. The first calibration error, the second calibration error, and the seven additional calibration errors were averaged to determine a run 1 robust mean 1002 of 0.20 degrees. It should be noted that the translational position was kept constant at each of the first position, the second position, and the additional seven positions in the first run.

The above steps were repeated for a second run, and second run calibration errors were determined for each respective elevation angle. Each of the second run calibration angles was plotted with respect to their respective elevation angle. The second run calibration angles were averaged to determine a run 2 robust mean 1004 of 1.16 degrees. Similar to the first run, the translational position was kept constant at each respective elevation angle of the second run.

The run 1 robust mean 1002 of 0.20 degrees can be compared to the run 2 robust mean 1004 of 1.16 degrees. The run 1 robust mean 1002 and the run 2 robust mean 1004 were performed consecutively with the same radar sensor and testing methodology. Still, the run 1 robust mean 1002 and the run 2 robust mean 1006 deviated by nearly 1 degree. This level of accuracy is unacceptable as perception systems in vehicles may require azimuth angle reporting to an accuracy of 1 degree.

FIG. 10-2 illustrates the performance of radar system calibration with bistatic sidelobe compensation. For a first run, a flat plate target was placed at a first position relative to a mounting position of a radar sensor. Unlike in FIG. 10-1 the first position includes a unique respective translational position and a respective elevation angle of −4 degrees. First radar data is collected indicative of radar signals reflecting off of the flat plate target at the first position relative to the mounting position of the radar sensor and usable to determine a first calibration error for the radar sensor. The flat plate target is then placed at a second position relative to the mounting position of the radar sensor. The second position includes a different respective translational position as the first position and a respective elevation angle of −3 degrees. Second radar data is collected indicative of radar signals reflecting off of the flat plate target at the second position relative to the mounting position of the radar sensor and usable to determine a second calibration error for the radar sensor. Seven additional radar data are collected indicative of radar signals reflecting off of the flat plate target at seven additional positions, which include the different translational position as the first position, the second position, and each other of the seven additional positions, and have respective elevation angles of −2, −1, 0, 1, 2, 3, and 4 degrees. A calibration error is determined for each of the seven additional radar data, and each of the first calibration error, the second calibration error, and the seven additional calibration errors are plotted with respect to their respective elevation angle. The first calibration error, the second calibration error, and the seven additional calibration errors were averaged to determine a run 1 robust mean 1006 of 0.06 degrees. It should be noted that the respective translational position of the first position, the second position, and the seven additional positions is unique and was kept constant as in FIG. 10-1.

The above steps were repeated for a second run, and second run calibration errors were determined for each respective elevation angle. Each of the second run calibration angles was plotted with respect to their respective elevation angle. The second run calibration angles were averaged to determine a run 2 robust mean 1008 of −0.14 degrees. Similar to the first run, the respective translational position is unique and was not kept constant at each respective elevation angle as in FIG. 10-1.

The run 1 robust mean 1006 of 0.06 degrees can be compared to the run 2 robust mean 1008 of −0.14 degrees. The run 1 robust mean 1006 and the run 2 robust mean 1008 were again performed consecutively with the same radar sensor and testing methodology, yet by using the radar system calibration technique described in this document, the deviation between the run 1 robust mean 1006 and the run 2 robust mean 1008 decreased to 0.20 degrees. As such, the radar calibration techniques described herein provide a method for improved radar system calibration with bistatic sidelobe compensation.

Example Processes

Figure 11:
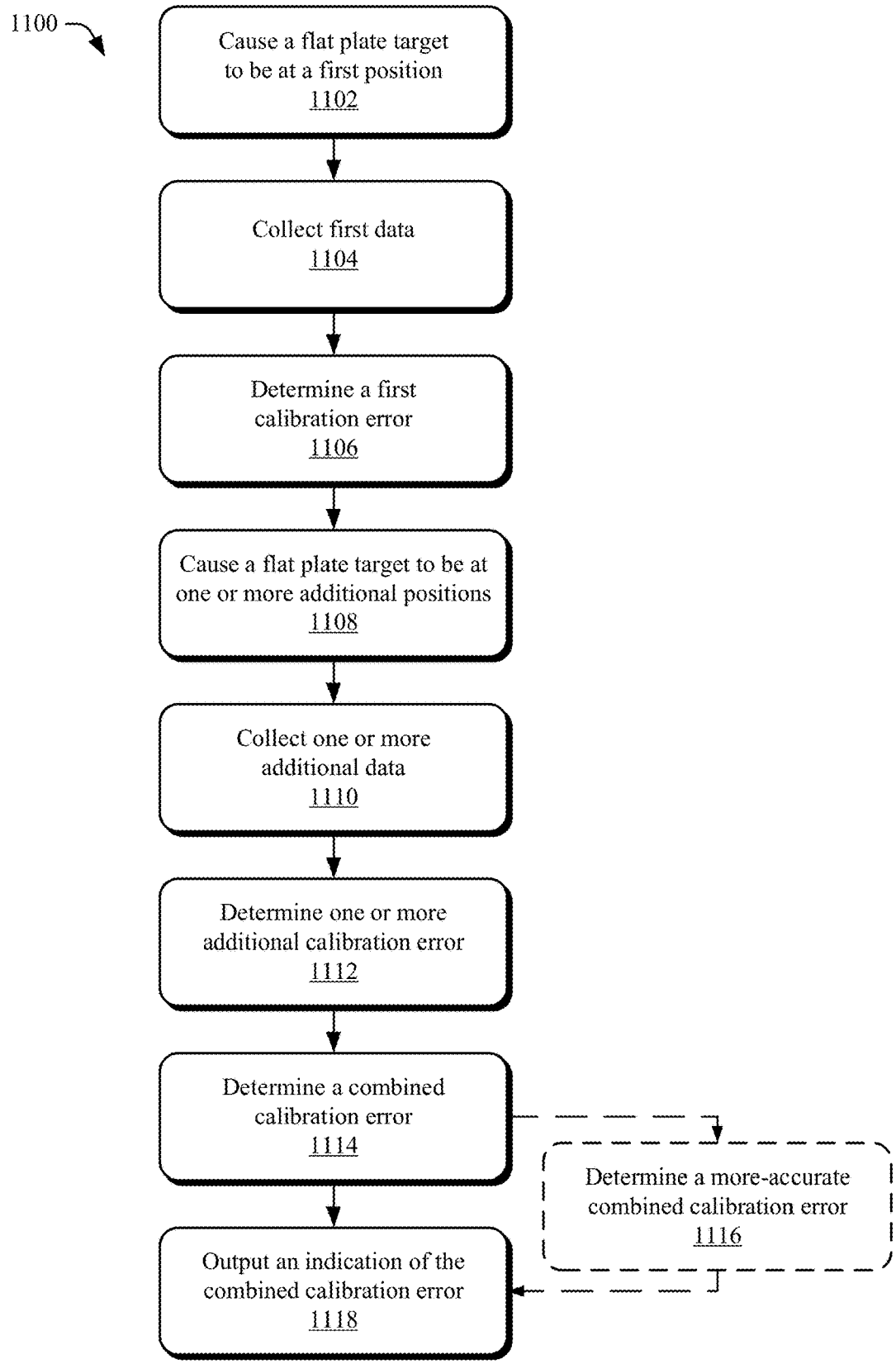
FIG. 11 illustrates an example process for performing radar system calibration with bi static sidelobe compensation.

FIG. 11 illustrates an example process 1100 for performing radar system calibration with bistatic lobe compensation performed by a radar system calibration unit. The steps of the process 1100 may be rearranged, skipped, repeated, or performed in different ways than the specific flow shown in FIG. 11. For ease of description, FIG. 11 is described in the context of FIG. 1.

At 1102, one or more processors cause a flat plate target to be at a first position in a test environment relative to a mounting position of a particular radar sensor of a radar system arranged in the test environment for radar system calibration. The first position includes a respective elevation angle and a respective translational position relative to the mounting position of that particular radar sensor. For example, a calibration system, such as the radar system calibration unit 126, may provide machine-readable instructions to a flat plate controller to move the flat plate target 106 to a first position.

At 1104, first data indicative of first radar signals that reflect off of the flat plate target at the first position is collected by the particular radar sensor. For example, the first data may include data usable to determine a phase response of the radar signals 118 received by the radar sensor 104. The first data may also include data usable to determine an amplitude of a radar signal reflection received by the radar sensor 104.

At 1106, a first calibration error for the particular radar sensor at the first position is determined based on the first data. For instance, the first calibration error may be a misalignment angle of the radar sensor 104 based on the first data.

At 1108, the one or more processors cause the flat plate target to be at one or more additional positions relative to the mounting position of the particular radar sensor. Each of the additional positions includes a respective elevation angle and a respective translational position relative to the mounting position of that particular radar sensor. For example, each of the respective elevation angle and respective translational position of the additional positions may be unique between each of the first position and each other additional position that the flat plate target 106 is directed to move to when each of the measurements is taken.

At 1110, the particular radar sensor collects additional data associated with each of the additional positions that are indicative of additional radar signals that reflect off of the flat plate target at each of the additional positions. At 1112, an additional calibration error for each of the additional positions is determined based on the additional data associated with each of the additional positions.

At 1114, a combined calibration error for that particular sensor given the mounting position of the particular radar sensor within the radar system is determined based on the first calibration error for the first position and each additional calibration error for each of the additional positions. In an aspect, the combined calibration error is determined through an average of the first calibration error for the first position and each additional calibration error for each of the additional positions.

Optionally, at 1116, iterative statistical analysis is used to determine a more accurate combined calibration error for the particular radar sensor. For example, the radar system calibration unit may determine a standard deviation calibration error for the particular radar sensor across the first and additional positions based on the first calibration error for first position and each additional calibration error for each of the additional positions. Based on the first calibration error, each of the additional calibration errors, and the standard deviation calibration error, the radar system calibration unit may determine an outlier calibration error set for the particular sensor and a remaining, inlier calibration error set for the particular radar sensor. Further, a more accurate combined calibration error (e.g., than another combined calibration error determined based on the outlier calibration error set) is determined for the particular sensor by averaging each of the first calibration error and the additional calibration error determined to be within the inlier calibration error set.

At 1118, the radar system calibration unit outputs an indication of the combined calibration error for use in adjusting the mounting position of the particular radar sensor within the radar system to calibrate the radar system. For example, the radar system calibration unit outputs the combined calibration error to a controller configured to provide machine-readable instructions to correct the combined calibration error for that particular sensor within the radar system.

Accordingly, in performing the process 1100, radar system calibration with bistatic sidelobe compensation is possible. For each radar sensor, measurements are obtained across a range of translational positions of the flat plate. Highly accurate calibration errors are determined for each radar sensor in this way. An indication of each calibration error may be output for use in individually adjusting the mounting position of each specific radar sensor within a radar system. By calibrating radar systems using the process 1100, or variations thereof, bistatic sidelobes in measurements may be reduced or even avoided, which may enable a less-complex and more-accurate calibration to be performed no matter the unique radar system installation.

ADDITIONAL EXAMPLES

Some additional examples of radar system calibration with bistatic sidelobe compensation include:

Example 1. A method for radar system calibration, comprising: causing, by one or more processors of a calibration system, a flat plate target to be at a first position in a test environment, the first position being relative to a mounting position of a particular radar sensor of a radar system that is arranged in the test environment to be calibrated, and including a respective elevation angle and a respective translational position relative the mounting position of the particular radar sensor; collecting, by the processors and from the particular radar sensor, first data indicative of first radar signals that reflect off of the flat plate target at the first position; determining, by the processors, based on the first data, a first calibration error for the particular radar sensor at the first position; causing, by the one or more processors, the flat plate target to be at one or more additional positions relative the mounting position of the particular radar sensor, each of the additional positions including a respective elevation angle and a respective translational position relative the mounting position of the particular radar sensor; collecting, by the processors and from the particular radar sensor, additional data associated with each of the additional positions, the additional data being indicative of additional radar signals that reflect off of the flat plate target at each of the additional positions; determining, by the processors, based on the additional data associated with each of the additional positions, an additional calibration error for each of the additional positions; determining, by the processors, based on the first calibration error for the first position and each additional calibration error for each of the additional positions, a combined calibration error for that particular sensor given the mounting position of the particular radar sensor within the radar system; and outputting, by the processors, an indication of the combined calibration error for use in compensating the radar system for the combined calibration error of the particular radar sensor to calibrate the radar system.

Example 2. The method of any of the previous examples, further comprising: determining, based on the first calibration error for the first position and each additional calibration error for each of the additional positions, a standard deviation calibration error for the particular radar sensor across the first position and the additional positions; determining, based on the first calibration error, each of the additional calibration errors, and the standard deviation calibration error, an outlier calibration error set for the particular sensor and a remaining, inlier calibration error set for the particular radar sensor; and determining, based on the inlier calibration error set, a more accurate combined calibration error for the particular radar sensor than another combined calibration error for the particular radar sensor that is based on the outlier calibration set, wherein outputting an indication of the combined calibration error includes outputting an indication of the more accurate combined calibration error.

Example 3. The method of any of the previous examples, wherein determining the inlier calibration error set comprises: determining, based on the standard deviation calibration error, a tolerance value; determining whether a portion of each of the first calibration error and each additional calibration error are within a range of the combined calibration error plus or minus the tolerance value; and grouping, into the inlier calibration error set, the portion of each of the first calibration error and each additional calibration error determined to be within the range.

Example 4. The method of any of the previous examples, wherein the particular radar sensor is a corner radar sensor.

Example 5. The method of any of the previous examples, wherein outputting the indication of the combined calibration error comprises outputting the combined calibration error for use in compensating the radar system to reduce effects from bistatic sidelobes.

Example 6. The method of any of the previous examples, wherein the bistatic sidelobes have amplitude levels up to 13 dB below a main lobe.

Example 7. The method of any of the previous examples, wherein the bistatic sidelobes include sidelobes reflected off of reflective objects nearby the flat plate target.

Example 8. The method of any of the previous examples, wherein outputting an indication of the combined calibration error enables an adjustment to the mounting position of the particular radar sensor within to be at an azimuth angle accuracy and elevation angle accuracy of less than 1 degree.

Example 9. The method of any of the previous examples, wherein outputting an indication of the combined calibration error includes providing the combined calibration error to a processor of the radar system that is configured to compensate for the combined calibration error for that particular sensor within the radar system.

Example 10. The method of any of the previous examples, wherein the flat plate target has a planar surface including a width dimension and a length dimension, and the first flat plate target comprises a multiple-point target.

Example 11. The method of any of the previous examples, the planar surface of the flat plat target is mapped using a grid of the length dimension and the width dimension; and the respective translational position of each of the first position and the additional positions corresponds to a different point on the grid along a centerline of the length dimension.

Example 12. The method of any of the previous examples, wherein the width dimension of the grid has a spacing of less than or equal to 3 mm.

Example 13. The method of any of the previous examples, wherein the radar system is arranged in the test environment for close-range calibration.

Example 14. The method of any of the previous examples, wherein the mounting position of the particular radar sensor is less than 2 meters from the flat plate target.

Example 15. The method of any of the previous examples, wherein the particular radar sensor comprises a low-resolution and further comprises an asymmetric gain pattern.

Example 16. The method of any of the previous examples, wherein the particular radar sensor is calibrated at or close to a field-of-view border of that particular radar sensor.

Example 17. The method of any of the previous examples, wherein the radar system is configured to operate in a vehicle.

Example 18. The method of any of the previous examples, wherein the radar system is installed in the vehicle when arranged in the test environment.

Example 19. The method of any of the previous examples, wherein the respective elevation angle and the respective translational position of each of the first position and the additional positions are unique among the first position and the additional positions.

Example 20. The method of any of the previous examples, wherein: the first position includes the respective elevation angle, the respective translational position, and a respective azimuth angle relative to the mounting position of the particular radar sensor; each of the additional positions includes the respective elevation angle, the respective translational position, and a respective azimuth angle relative to the mounting position of the particular radar sensor; and the respective azimuth angle of each of the first position and the additional positions is different than the respective azimuth angle of each other of the first position and the additional positions.

Example 21. The method of any of the previous examples, further comprising: determining, for each radar sensor of the radar system, a respective combined calibration error for that radar sensor; and outputting an indication of the respective combined calibration error for each of the radar sensors to be used in adjusting the mounting position of each of the radar sensors to calibrate the radar system.

Example 22. A calibration system, comprising at least one processor configured to: cause a flat plate target to be at a first position in a test environment, the first position being relative to a mounting position of a particular radar sensor of a radar system that is arranged in the test environment to be calibrated, and including a respective elevation angle and a respective translational position relative to the mounting position of the particular radar sensor; collect, from the particular radar sensor, first data indicative of first radar signals that reflect off of the flat plate target at the first position; determine, based on the first data, a first calibration error for the particular radar sensor at the first position; cause the flat plate target to be at one or more additional positions relative to the mounting position of the particular radar sensor, each of the additional positions including a respective elevation angle and a respective translational position relative the mounting position of the particular radar sensor; collect, from the particular radar sensor, additional data associated with each of the additional positions, the additional data being indicative of additional radar signals that reflect off of the flat plate target at each of the additional positions; determine, based on the additional data associated with each of the additional positions, an additional calibration error for each of the additional positions; determine, based on the first calibration error for the first position and each additional calibration error for each of the additional positions, a combined calibration error for that particular sensor given the mounting position of the particular radar sensor within the radar system; and output an indication of the combined calibration error for use in compensating the radar system for the combined calibration error of the particular radar sensor to calibrate the radar system.

Example 23. A system as in any of the preceding examples, further configured to: determine, based on the first calibration error for the first position and each additional calibration error for each of the additional positions, a standard deviation calibration error for the particular radar sensor across the first position and the additional positions; determine, based on the first calibration error, each of the additional calibration errors, and the standard deviation calibration error, an outlier calibration error set for the particular sensor and a remaining, inlier calibration error set for the particular radar sensor; and determine, based on the inlier calibration error set, a more accurate combined calibration error for the particular radar sensor than a combined calibration error for the particular radar sensor that is based on the outlier calibration set, wherein outputting an indication of the combined calibration error includes outputting an indication of the more accurate combined calibration error.

Example 24. A system as in any of the preceding examples, wherein: determining the inlier calibration error set comprises: determining, based on the standard deviation calibration error, a tolerance value; determining whether a portion of each of the first calibration error and the additional calibration errors are within a range of the combined calibration error plus or minus the tolerance value; and grouping, into the inlier calibration error set, the portion of each of the first calibration error and the additional calibration errors determined to be within the range.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims. In addition to radar systems, problems associated with sensor calibration can occur in other systems (e.g., image systems, lidar systems, ultrasonic systems) that utilize a variety of sensors. Therefore, although described as a way to calibrate radar systems, the techniques of the foregoing description can be adapted and applied to other problems to effectively calibrate a variety of sensor utilized systems.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A method, comprising:
causing, by one or more processors of a calibration system, a flat plate target to be at a first position in a test environment, the first position being relative to a mounting position of a particular radar sensor of a radar system that is arranged in the test environment to be calibrated, and including a respective elevation angle and a respective translational position relative the mounting position of the particular radar sensor;
collecting, by the processors and from the particular radar sensor, first data indicative of first radar signals that reflect off of the flat plate target at the first position;
determining, by the processors, based on the first data, a first calibration error for the particular radar sensor at the first position;
causing, by the one or more processors, the flat plate target to be at one or more additional positions relative the mounting position of the particular radar sensor, each of the additional positions including a respective elevation angle and a respective translational position relative the mounting position of the particular radar sensor;
collecting, by the processors and from the particular radar sensor, additional data associated with each of the additional positions, the additional data being indicative of additional radar signals that reflect off of the flat plate target at each of the additional positions;

determining, by the processors, based on the additional data associated with each of the additional positions, an additional calibration error for each of the additional positions;

determining, by the processors, based on the first calibration error for the first position and each additional calibration error for each of the additional positions, a combined calibration error for that particular sensor given the mounting position of the particular radar sensor within the radar system; and outputting, by the processors, an indication of the combined calibration error for use in compensating the radar system for the combined calibration error of the particular radar sensor to calibrate the radar system.

2. The method of claim 1, further comprising:

determining, based on the first calibration error for the first position and each additional calibration error for each of the additional positions, a standard deviation calibration error for the particular radar sensor across the first position and the additional positions;

determining, based on the first calibration error, each of the additional calibration errors, and the standard deviation calibration error, an outlier calibration error set for the particular sensor and a remaining, inlier calibration error set for the particular radar sensor; and determining, based on the inlier calibration error set, a more accurate combined calibration error for the particular radar sensor than another combined calibration error for the particular radar sensor that is based on the outlier calibration set, wherein outputting an indication of the combined calibration error includes outputting an indication of the more accurate combined calibration error.

3. The method of claim 2, wherein determining the inlier calibration error set comprises:

determining, based on the standard deviation calibration error, a tolerance value;

determining whether a portion of each of the first calibration error and each additional calibration error are within a range of the combined calibration error plus or minus the tolerance value; and grouping, into the inlier calibration error set, the portion of each of the first calibration error and each additional calibration error determined to be within the range.

4. The method of claim 1, wherein outputting the indication of the combined calibration error comprises outputting the combined calibration error for use in compensating the radar system to reduce effects from bistatic sidelobes.

5. The method of claim 1, wherein the particular radar sensor is a corner radar sensor.

6. The method of claim 1, wherein outputting an indication of the combined calibration error enables an adjustment to the mounting position of the particular radar sensor to be at an azimuth angle accuracy and elevation angle accuracy of less than 1 degree.

7. The method of claim 1, wherein outputting an indication of the combined calibration error includes providing the combined calibration error to a processor of the radar system that is configured to compensate for the combined calibration error for that particular sensor within the radar system.

8. The method of claim 1, wherein the flat plate target has a planar surface including a width dimension and a length dimension and the flat plate target comprises a multiple-point target.

9. The method of claim 8, wherein:

the planar surface of the flat plat target is mapped using a grid of the length dimension and the width dimension; and the respective translational position of each of the first position and the additional positions corresponds to a different point on the grid along a centerline of the length dimension.

10. The method of claim 1, wherein the radar system is arranged in the test environment for close-range calibration.

11. The method of claim 10, wherein the mounting position of the particular radar sensor is less than 2 meters from the flat plate target.

12. The method of claim 1, wherein the particular radar sensor comprises a low-resolution and further comprises an asymmetric gain pattern.

13. The method of claim 1, wherein the radar system is configured to operate in a vehicle.

14. The method of claim 13, wherein the radar system is installed in the vehicle when arranged in the test environment.

15. The method of claim 1, wherein the respective elevation angle and the respective translational position of each of the first position and the additional positions are unique among the first position and the additional positions.

16. The method of claim 15, wherein:

the first position includes the respective elevation angle, the respective translational position, and a respective azimuth angle relative to the mounting position of the particular radar sensor;

each of the additional positions includes the respective elevation angle, the respective translational position, and a respective azimuth angle relative to the mounting position of the particular radar sensor; and the respective azimuth angle of each of the first position and the additional positions is different than the respective azimuth angle of each other of the first position and the additional positions.

17. The method of claim 1, further comprising:

determining, for each radar sensor of the radar system, a respective combined calibration error for that radar sensor; and outputting an indication of the respective combined calibration error for each of the radar sensors to be used in adjusting the mounting position of each of the radar sensors to calibrate the radar system.

18. A calibration system, comprising at least one processor configured to:

cause a flat plate target to be at a first position in a test environment, the first position being relative to a mounting position of a particular radar sensor of a radar system that is arranged in the test environment to be calibrated, and including a respective elevation angle and a respective translational position relative to the mounting position of the particular radar sensor;

collect, from the particular radar sensor, first data indicative of first radar signals that reflect off of the flat plate target at the first position;

determine, based on the first data, a first calibration error for the particular radar sensor at the first position;

cause the flat plate target to be at one or more additional positions relative to the mounting position of the particular radar sensor, each of the additional positions including a respective elevation angle and a respective translational position relative the mounting position of the particular radar sensor;

collect, from the particular radar sensor, additional data associated with each of the additional positions, the additional data being indicative of additional radar signals that reflect off of the flat plate target at each of the additional positions;

determine, based on the additional data associated with each of the additional positions, an additional calibration error for each of the additional positions;

determine, based on the first calibration error for the first position and each additional calibration error for each of the additional positions, a combined calibration error for that particular sensor given the mounting position of the particular radar sensor within the radar system; and output an indication of the combined calibration error for use in compensating the radar system for the combined calibration error of the particular radar sensor to calibrate the radar system.

19. The system of claim 18, further configured to:

determine, based on the first calibration error for the first position and each additional calibration error for each of the additional positions, a standard deviation calibration error for the particular radar sensor across the first position and the additional positions;

determine, based on the first calibration error, each of the additional calibration errors, and the standard deviation calibration error, an outlier calibration error set for the particular sensor and a remaining, inlier calibration error set for the particular radar sensor; and determine, based on the inlier calibration error set, a more accurate combined calibration error for the particular radar sensor than a combined calibration error for the particular radar sensor that is based on the outlier calibration set, wherein outputting an indication of the combined calibration error includes outputting an indication of the more accurate combined calibration error.

20. The system of claim 19, wherein determining the inlier calibration error set comprises:

determining, based on the standard deviation calibration error, a tolerance value;

determining whether a portion of each of the first calibration error and the additional calibration errors are within a range of the combined calibration error plus or minus the tolerance value; and grouping, into the inlier calibration error set, the portion of each of the first calibration error and the additional calibration errors determined to be within the range.

* * * * *

UNITED STATES PATENT AND TRADEMARK OFFICE
CERTIFICATE OF CORRECTION

| | | |
|---|---|---|
| PATENT NO. | : 11,933,911 B2 | Page 1 of 1 |
| APPLICATION NO. | : 17/407071 | |
| DATED | : March 19, 2024 | |
| INVENTOR(S) | : Armin Talai et al. | |

It is certified that error appears in the above-identified patent and that said Letters Patent is hereby corrected as shown below:

On the Title Page

Column 1, item (71) Applicant, Lines 1-2: Delete "Aptiv Technologies Limited, St. Michael (BB)" and insert --Aptiv Technologies AG, Schaffhausen (CH)--

Signed and Sealed this
Twenty-fifth Day of March, 2025

Coke Morgan Stewart
*Acting Director of the United States Patent and Trademark Office*